E. M. KOEHLER.
FLORAL CANOPY.
APPLICATION FILED MAR. 3, 1920.
1,390,566.
Patented Sept. 13, 1921.
2 SHEETS—SHEET 2.
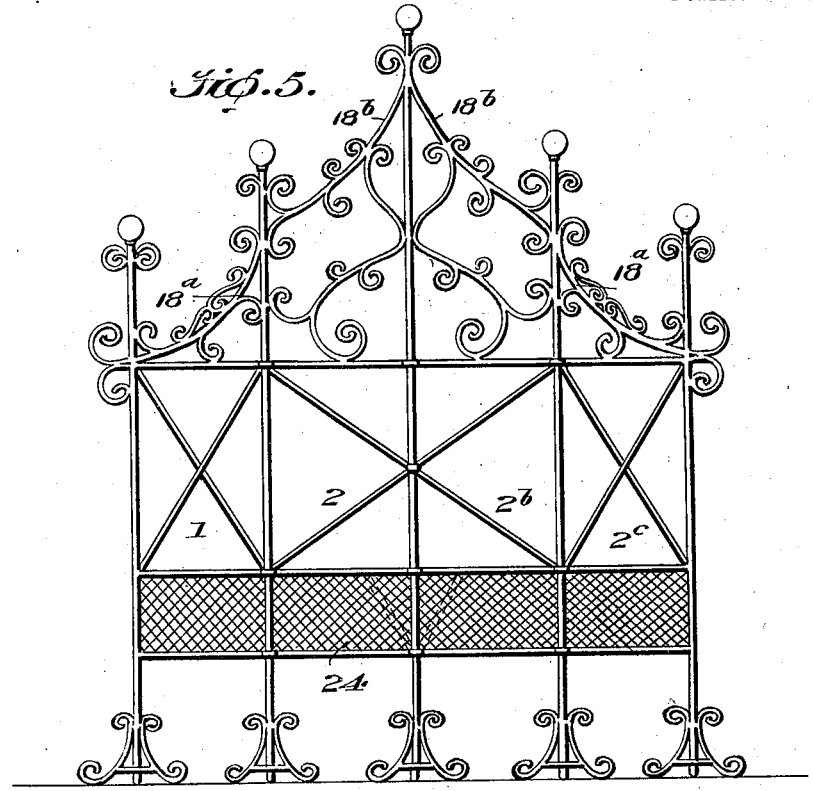
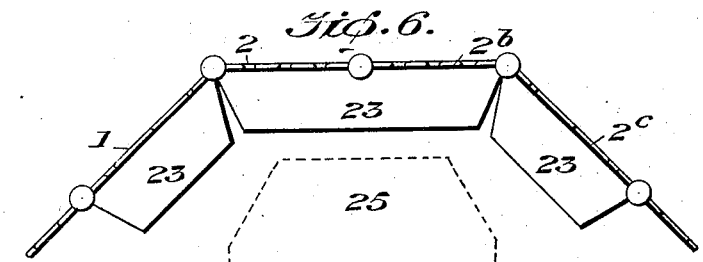
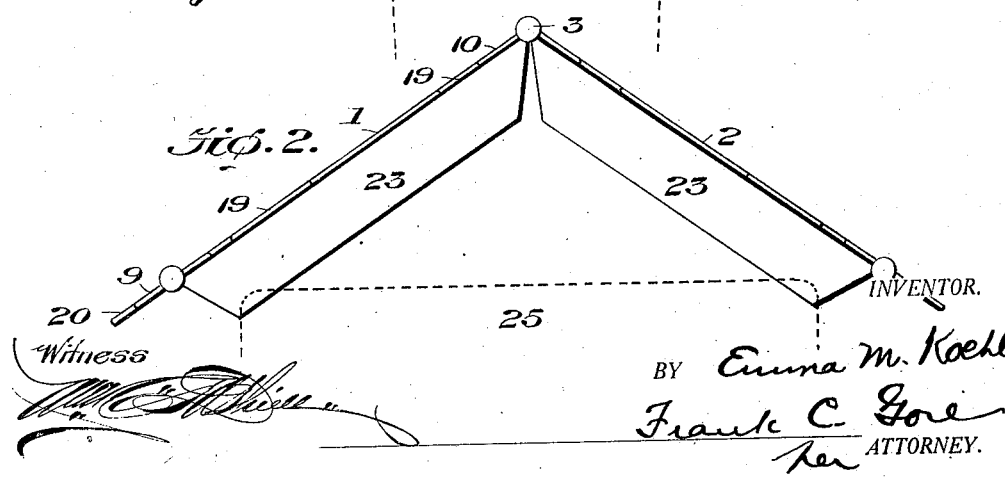

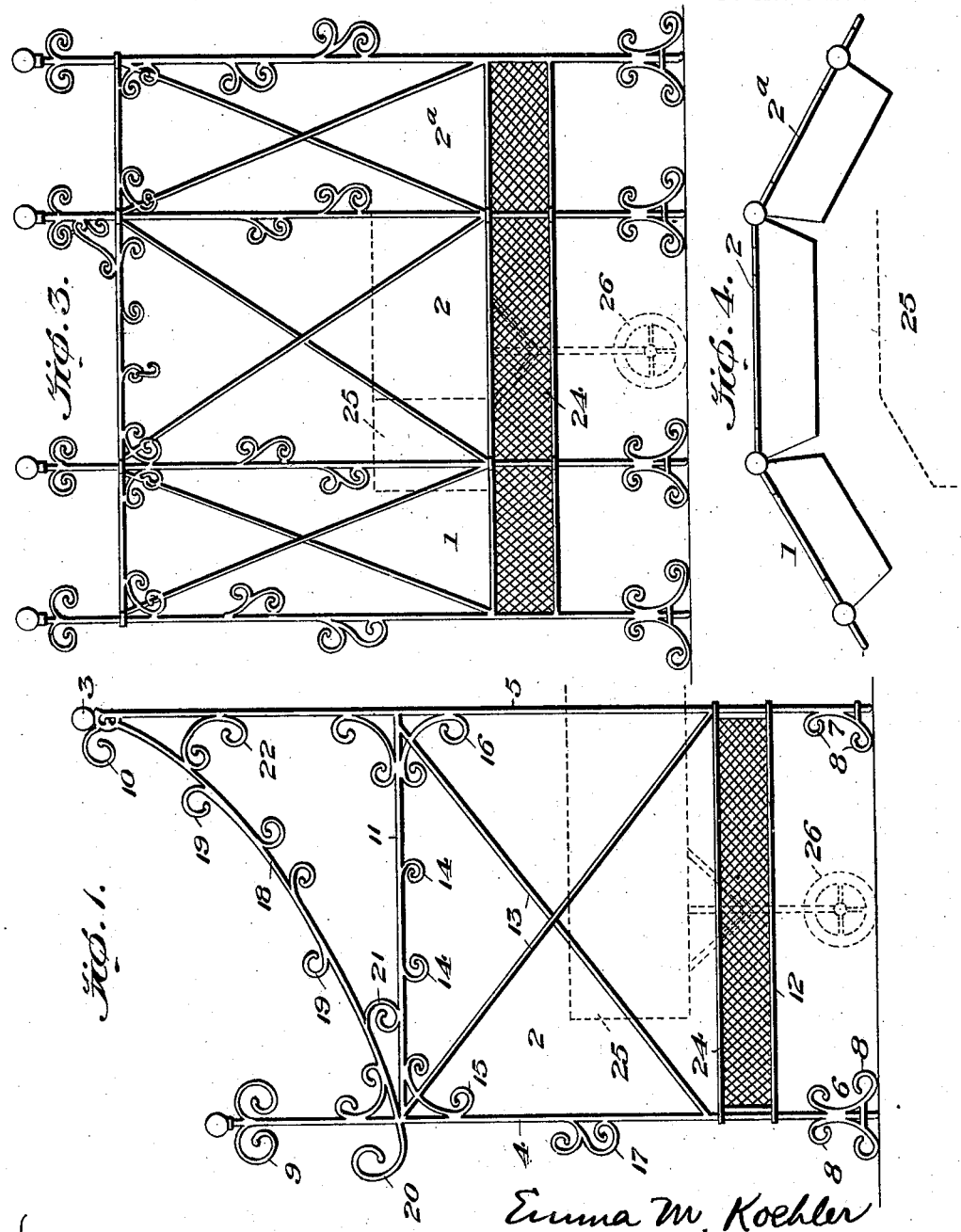

UNITED STATES PATENT OFFICE.

EMMA M. KOEHLER, OF EVANSVILLE, INDIANA.

FLORAL CANOPY.

1,390,566.  Specification of Letters Patent.  Patented Sept. 13, 1921.

Application filed March 3, 1920. Serial No. 362,945.

*To all whom it may concern:*

Be it known that I, EMMA M. KOEHLER, a citizen of the United States, residing at Evansville, in the county of Vanderburgh and State of Indiana, have invented certain new and useful Improvements in Floral Canopies, of which the following is a specification.

The object of my invention is to provide an improved rack or holder for flowers and floral pieces for the purpose of suitably and effectively holding them adjacent the casket at funeral services, thereby disposing the flowers and floral tributes in such position that they will not be injured or stepped upon.

I designate my invention a "floral canopy" without, however, meaning to limit it to a flower holder which is disposed over the casket as, on the contrary, the device is in the form of a folding rack or stand of either two, three or four panels adapted to be disposed in upright position adjacent the casket, preferably near the head end thereof.

The effect produced by the disposal of the flowers and floral pieces is more beautiful than when they are piled indiscriminately on the casket, along-side thereof, or on chairs, which practice commonly prevails at the present time.

My floral canopy is provided with hooks, holders, or like devices which are not only ornamental but serve to hang or support the flowers and pieces. In addition, shelves may be provided on which the flowers and floral pieces may rest. When the flowers and floral tributes are in position on the floral canopy, the latter being portable, any suitable disposal of the canopy may be made, according to the shape of the room, its size, the position of the casket and the proximity of other objects. The flowers and floral tributes are held clear of the floor and at a suitable height to present the most beautiful and satisfactory appearance; furthermore, the canopy may be used to screen the casket to a certain extent.

I am aware that modifications may be resorted to in carrying out my invention as it is not essential that the construction and arrangement be as precisely hereinafter described and which is shown in the accompanying drawings, and it is to be considered, therefore, that the disclosure is illustrative, and not restrictive, of the scope of the invention.

In the accompanying drawings,

Figure 1 is a front elevation and Fig. 2 a plan view of one form of the invention shown associated with a casket and its carriage or support;

Figs. 3 and 4 front and plan views of another form, and

Figs. 5 and 6 front and plan views of another modification.

Referring to Figs. 1 and 2, the canopy comprises two duplicate sections or panels 1 and 2 which are hinged or jointed together at 3 in a screen-like form. The panels being duplicates, a description of one will suffice. There are uprights 4 and 5 of tubular or rod form which are provided with ornamental feet 6, 7 of scroll form having hooks 8. The uprights 4, 5 are surmounted by ornamental hooks or scrolls 9, 10 and they are connected by rod or tubular cross bars 11, 12 and crossed inclined braces of wire 13. The upper cross piece 11 is provided with ornamental scrolls or hooks 14. Scrolls or hooks 15, 16 connect the cross rod or tube 11 with the uprights 4 and 5, respectively. The upright 4 has ornamental scrolls or hooks 17. An ornamental top piece 18 is arranged in curved or inclined disposition and runs downwardly from the upper part of the upright 5 to the upright 4 where the cross rod or top 11 joins said upright 4. This top piece 18 is provided with scrolls or hooks 19 at suitable points and it may terminate at its lower end in a scroll or hook 20. Other scrolls or hooks 21, 22 are interposed between the top piece 18 and the cross rod 11; also, between the top piece and the upright 5.

The lower portion of each panel 1, 2 is provided with a shelf 23 adjacent which is a section of screen or screening material 24.

The casket is shown at 25 and the carriage or truck therefor at 26.

The foregoing description of the various hooks or scrolls and their position is by way of illustration and not in limitation of the position, number, and precise form of the scrolls or hooks. The scrolls or hooks afford means for hanging or securing cut flowers or floral tributes or pieces which may be arranged to afford beautiful effects and the flowers may be disposed so that they will partially or wholly cover the panels. Heavy floral pieces may be disposed on the shelves 23. The screens 24 prevent the heavy floral pieces from slipping out of position.

The form of the canopy shown in Figs. 3 and 4, and the construction thereof, is much the same as that described except that the top piece 18 is omitted and a third section 2ª is added to the sections 1 and 2, making a three panel canopy.

In the form shown in Figs. 5 and 6 a third and fourth panel 2ᵇ, 2ᶜ are added making a four panel canopy. In this form top pieces 18ª and 18ᵇ, provided with hooks or scrolls, are provided.

In each form of my invention the panels are hinged together and may be swung to any desired angle so that they are adapted to be positioned in relation to the casket as may be found preferable or desired.

My invention is adaptable for use either at the house or at the church.

Having thus described my invention, what I claim is:—

A skeleton panel for a floral canopy having crossed braces and lateral cross connections constituting a rigid frame, an exposed shelf connecting the lower parts of the uprights below the braces and projecting out from the plane of the panel, and an upright screen connected to the uprights and located at the back of said shelf, and means on the upper part of the panel for sustaining flowers.

In testimony whereof I affix my signature.

EMMA M. KOEHLER.